United States Patent

[11] 3,575,519

[72] Inventors Russell L. Bruner
San Diego;
John B. Strohauer, La Mesa, Calif.
[21] Appl. No. 829,610
[22] Filed June 2, 1969
[45] Patented Apr. 20, 1971
[73] Assignee The United States of America as
represented by the Secretary of the Navy

[54] DRILL GUIDE ASSEMBLY
4 Claims, 4 Drawing Figs.

[52] U.S. Cl. .................................................... 408/97,
408/116
[51] Int. Cl. ..................................................... B23b 49/02,
B23b 45/14

[50] Field of Search .......................................... 77/13, 55
(G), 62

[56] References Cited
UNITED STATES PATENTS
2,541,306  2/1951  Taylor ........................... 77/13

Primary Examiner—Francis S. Husar
Attorneys—Joseph C. Warfield, Jr., George J. Rubens and John W. McLaren ABSTRACT: A drill collet or guide assembly for portable drill tools that rigidly locks the drill tool to a jig bushing in an aligned position to ensure accurate and rapid drilling of a plurality of aligned bores in a workpiece.

PATENTED APR 20 1971  3,575,519
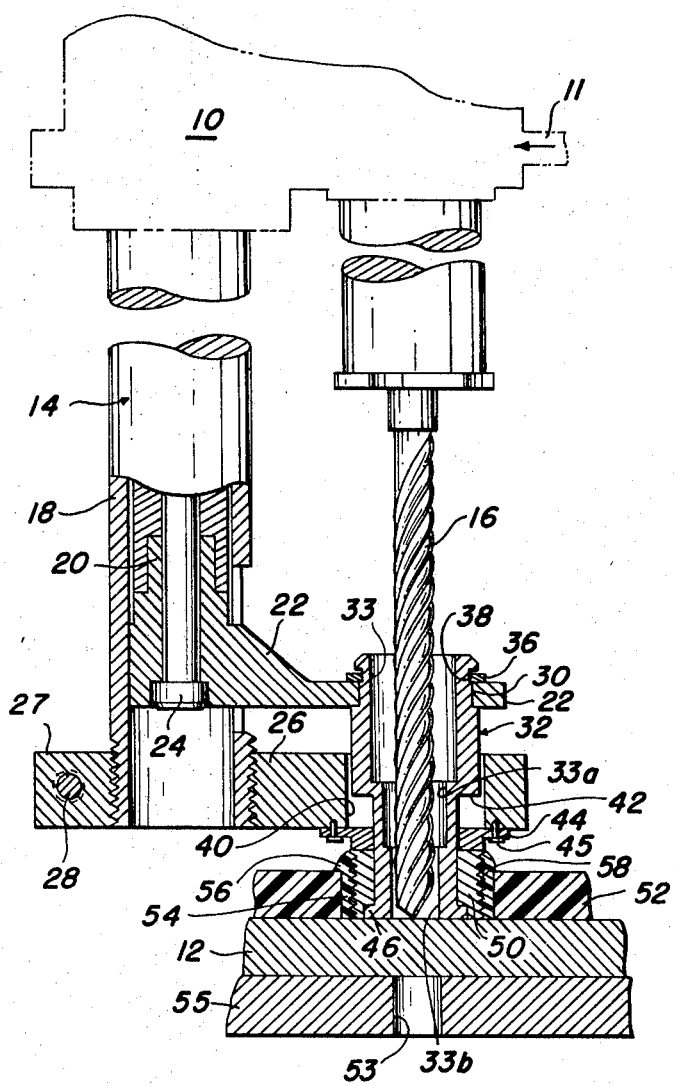
FIG. 1
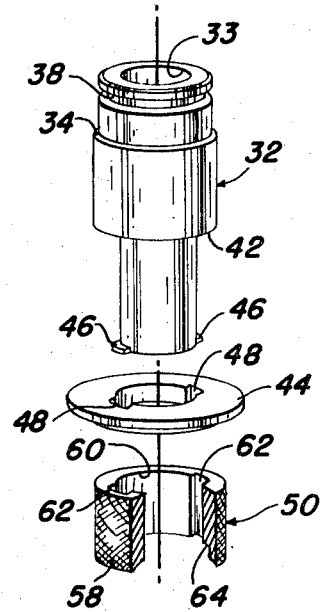
FIG. 2
FIG. 3
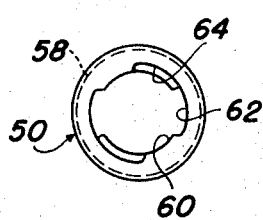
FIG. 4
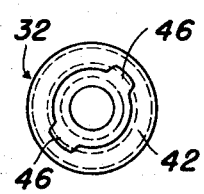
INVENTORS
RUSSELL L. BRUNER
BY JOHN B. STROHAUER
George J. Rubens
ATTORNEYS

DRILL GUIDE ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to improvements in portable drill tools, and more particularly to a collet attachment for such a drill tool for use with a drill jig.

U.S. Pat. No. 2,935,905 discloses a portable pneumatic drill particularly suited for drilling a plurality of closely spaced holes in a workpiece, such as the metal skin of an aircraft wing. This patented tool has a collet attachment for locking the tool successively to a series of bushings mounted in a drill jig that is conventionally used to locate accurately the drill spindle relative to the holes in the workpiece to be drilled. The collet attachment serves the purpose of aligning the cutting bit of the drill tool with the drill bushing of the jig, and also for clamping the drill tool to the jig just prior to the drilling operation.

The patented collet attachment substantially reduced the time, and improved the accuracy, of drilling a plurality of holes and was a big improvement over the previous hand-guided devices in which the collets were not secured to the jigs.

However, the patented collet provided a frictional locking of the collet to the drill jig through a plurality of fingers on the spring-locked collet sleeve; the collet having a cam surface for radially expanding the split collet sleeve so that the fingers would functionally contact the jig bushing. Not only was such a locking means complex and subject to wear and breakage, but most important, this structure limited the spacing between holes and prevented the drilling of holes that were more closely spaced, namely, in the order of one inch.

SUMMARY OF THE INVENTION

The invention provides an improved collet attachment for a portable pneumatic drill that permits the accurate drilling of a plurality of closely spaced holes in a workpiece. The attachment is designed with a more compact and rugged locking connection to enable the drill to be used on workpieces with holes that are spaced closer together. In other words, less spacing is needed between the holes to accommodate the collet attachment of this invention. This is an important consideration in the fabrication of aircraft wings where the rivets that secure the skin to the supporting wing structure are closely spaced.

A jig is fabricated for each segment of the workpiece and contains bushings arranged in an aligned position with the holes to be drilled. Each bushing has a bore that is machined with slots to receive corresponding projecting lugs on the collet. When the collet is rotatably engaged in the bushing, the drill tool is locked to the jig for commencement of the drilling operation regardless of its orientation.

STATEMENT OF THE OBJECTS

An important object of this invention is to provide a collet attachment for a pneumatic drill tool that will accurately drill a plurality of more closely spaced holes in a minimum period of time.

Another important object is to provide such a collet attachment that positively locks the tool to the associated jig.

Still another object is to provide a collet attachment that is simple in operation and rugged in design, can be quickly engaged and disengaged, and occupies a minimum of lateral space beyond the size of the hole to be drilled so that the tool can accommodate a workpiece that has holes with closer centerline distances.

Other objects and many of the attendant advantages of this invention will be readily appreciated as the same becomes better understood by reference to the following detailed description when considered in connection with the accompanying drawings wherein:

FIG. 1 is a partial elevation view of a pneumatic power drill having a collet attachment shown in section and engaged with a workpiece;

FIG. 2 is an exploded elevation view, partially in section, of the novel collet attachment and jig bushing with the collet lugs aligned for engagement with the receiving slots of the jig bushing;

FIG. 3 is a bottom view of the collet showing the disposition of the attaching lugs; and FIG. 4 is a bottom view of the jig bushing showing the arrangement of the slots and camming surfaces to accommodate the collet lugs.

Referring to the drawing where like reference numerals refer to similar parts throughout the drawing, there is shown in FIG. 1 a hand held portable pneumatic power tool drill 10 of the type shown in U.S. Pat. No. 2,936,905 that can be connected to a suitable source of compressed air via hose 11. One of the features of this drill tool is the provision for clamping the tool to a workpiece 12, such as the skin of an aircraft, by means of a ram 14 to align the drill bit 16 with the workpiece during the drilling operation.

Ram 14 includes a ram sleeve 18 in which reciprocates a ram rod 20 when driven by the compressed air. Piston 20 terminates in an arm 22 secured thereto by a bolt 24. Ram sleeve 18 terminates in a pressure foot 26 threaded to the end thereto and having split arms 27 clamped in position by screw 28. As will be described later, piston arm 22 and pressure foot 26 are drawn apart by operation of the pneumatic tool to clamp the tool firmly to the workpiece.

Piston arm 22 terminates in a bored end 30 adapted to receive and support a novel collet 32 having a longitudinal stopped bore 33 through which extends drill bit 16. The collet has an external shoulder 34 which abuts arm 22 and is secured within arm 22 by a snap ring 36 seated in an annular recess 38 on the collet.

Collet 32 extends downward slidably through a bored opening 40 in pressure foot 26 and is limited in its movement by an external shoulder 42 formed by a reduced collet bore 33a. Shoulder 42 is adapted to engage an adapter plate 44 bolt at 45 to the under portion of pressure foot 26.

Collet 32 has at its lower end a pair of integral ears or lugs 46 which are extendable through corresponding slots 48 of adapter plate 44 and adapted to engage a bushing 50 mounted in a drill jig 52 in a manner presently to be described. Adapter plate 44 is screwed to the bottom surface of pressure foot 26 after the collet guide is mounted to arm 22.

In the process of replacing the metal skin of an aircraft it is necessary to be able to drill the holes in the replacement skin 12 so as to be aligned precisely with the holes 53 in the wing frame structures 55 to enable the use of rivets or similar fasteners, not shown. In the repair of naval aircraft, it is the practice to fabricate jig 52 with bushings 50 perfectly aligned with holes 53 in the supporting structure. This is accomplished in the present invention by using a jig made of fiberglass and plastic with a plurality of enlarged openings 54, one opening for each hole to be drilled. A bushing is inserted in each opening 54 and being smaller in diameter than the opening is moved laterally until aligned with the hole in the supporting structure. By means of a plastic potting compound 56 each bushing 50 is rigidly secured in the jig in its aligned position.

Each bushing 50 is exteriorly knurled or threaded at 58 to provide a suitable frictional engagement with the potting compound to facilitate anchoring the bushing in the jig, which is not needed at the area of engagement with jig 52 which is also made of plastic material with which potting compound 56 has a good affinity.

Referring to FIGS. 2 and 4 jig bushing 50 is provided with a bore opening 60 having a pair of oppositely disposed longitudinal slots 62 adapted to receive collet lugs 46. Each slot 62 terminates in a connecting arcuate camming surface 64 extending in a clockwise position when viewed from the top (FIG. 2). Slots 62 and 64 form in effect an L-shaped groove similar to the bayonet-type connection as is commonly found on automobile electric bulbs.

OPERATION

Before the drilling operation is started, jig 52 is fabricated with each bushing 50 potted therein in an aligned position with its corresponding opening 53 in supporting structure 55. The workpiece 12 is then secured in position on the supporting structure, and jig 52 is secured in position with each bushing 50 aligned precisely with its respective opening 53 in supporting structure 55.

Power drill 10 is held by the operator and collet 32 is fully inserted into bushing 50 with lugs 46 aligned with bushing slots 60. When the collet engages workpiece 12 the operator rotates the tool clockwise sufficient to lock lugs 46 in cam slots 64. The operator then starts the drill. Application of pneumatic power causes ram sleeve 18 and ram piston rod 20 to move apart, that is, piston arm 22 will move upwardly carrying collet 32 to pull upwardly on bushing 50. If adapter plate 44 is not engaging the top surface of bushing 50, ram sleeve 18 will then move downwardly until plate 44 does engage 50 at which time bushing 50 is tightly clamped by arm 22 and pressure foot 26 to tightly hold tool 10 to the workpiece. This clamping action will support the tool in any position required by the workpiece, i.e., in an upside down position. Simultaneously drill bit 16 commences rotation and as collet 32 is locked in position, drill bit 16 rotating in reduced bore portion 33b of the collet is in effect pulled down into drilling engagement with workpiece 12 to drill the hole therein in perfect alignment with hole 53 in the supporting structure without the need for the application of a drilling pressure by the operator. At the end of the drilling operation, the tool is deactivated, pneumatic pressure on ram piston rod being relieved to free bushing 50 from the clamping action between collet 32 and adapter plate 44 so that the operator can rotate tool counterclockwise to disengage lugs 46 from cam slot 64 to permit the tool to be withdrawn and advanced to the next drilling station.

Thus it can be seen that the collet attachment of this invention simplifies and expedites the drilling operations of a workpiece, and is particularly advantageous where the workpiece requires the mass drilling of many holes closely spaced together, such as an aircraft wing. The invention device is rugged in design and can be readily engaged and disengaged which feature is important to expedite the drilling operation. The compactness of design enables holes to be drilled that are closer together than was heretofore possible with prior art collet attachments. The clamping feature of the collet guide ensures perfect alignment of the tool bit without the need for the application of any drilling pressure by the operator.

Obviously many modifications and variations of the present invention are possible in the light of the above teachings. It is therefore to be understood that within the scope of the appended claims the invention may be practiced otherwise than as specifically described.

We claim:

1. The combination of a collet member and a bushing member, the bushing member being mounted in a jig for use with a power-tool drill;
   one of said members having a projecting ear;
   the other of said members having a slot to receive said ear for locking said members in assembled position;
   said jig being provided with an aperture larger than the bushing to permit the bushing to be laterally aligned with respect to a workpiece;
   means securing the bushing to the jig in the aligned position;
   whereby the tool drill can be locked to the jig bushing during the drilling operation.

2. The combination of claim 1 wherein said jig is provided with an aperture larger than the bushing;
   said bushing being secured within an aligned position in the jig aperture by means of a potting compound.

3. The combination of claim 2 wherein said jig is fabricated of a plastic material and on an outer surface of said bushing is knurled to be gripped by the potting compound.

4. The combination of a collet and a bushing member for use with a power tool drill;
   a jig fabricated of a plastic matter and having openings therein, one opening for each hole to be drilled in a workpiece,
   a jig bushing having a bore opening adapted to be aligned with the hole to be drilled,
   an L-shaped slot formed in said bushing bore,
   said jig opening being configured to be larger than the bushing to permit the bushing to be adjusted to an aligned position with the workpiece,
   a potting compound securing said bushing in an aligned position in the jig,
   a collet supported by said tool,
   said collet having at least one projecting ear adapted to be engaged with one leg portion of said bushing slot and be secured by rotation to engage the other leg portion of said slot,
   whereby upon the application of power the tool is locked to the bushing to permit the workpiece to be drilled.